Figure 7:
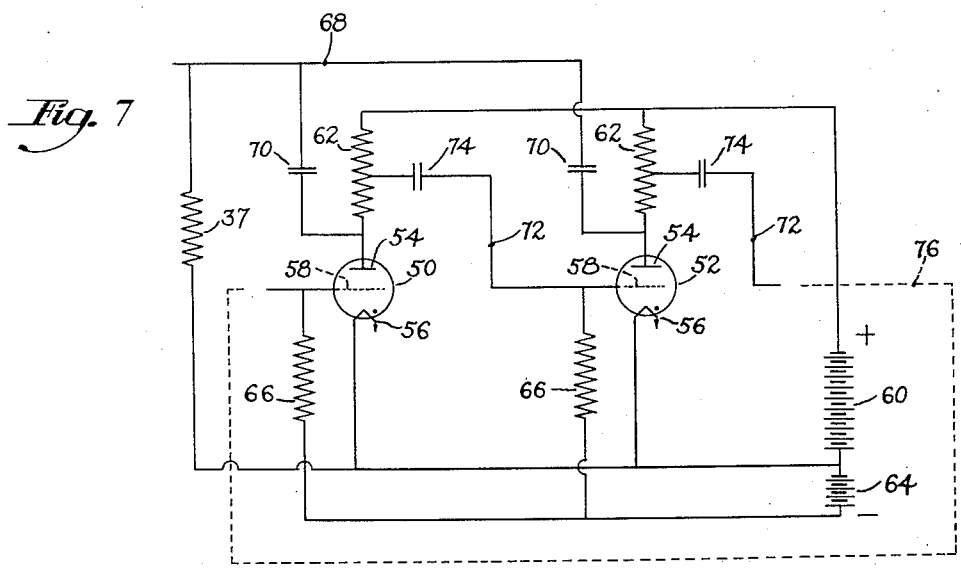

July 30, 1946.     W. P. OVERBECK     2,404,918
COUNTING SYSTEM
Filed May 1, 1940     2 Sheets-Sheet 1
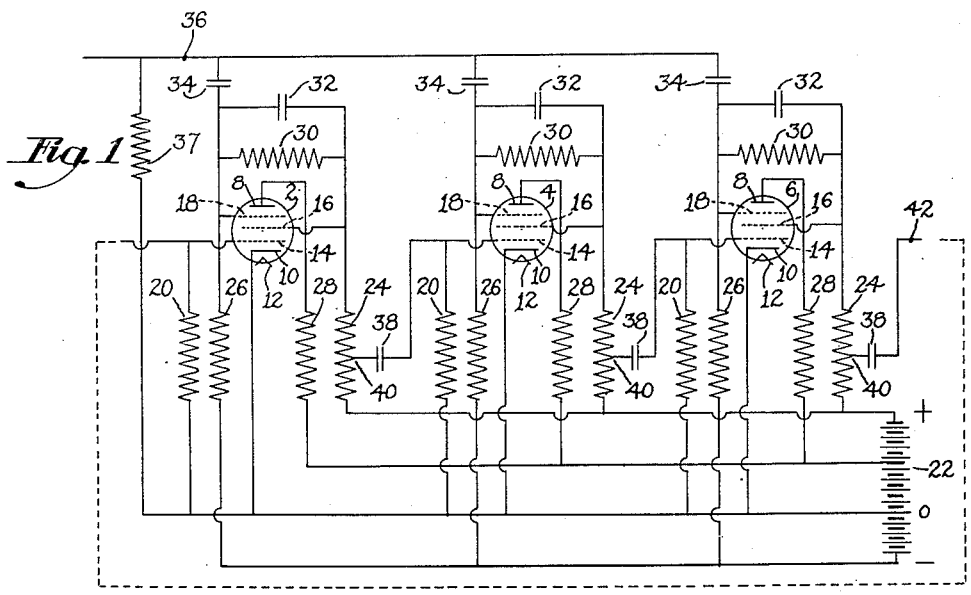
Fig. 1
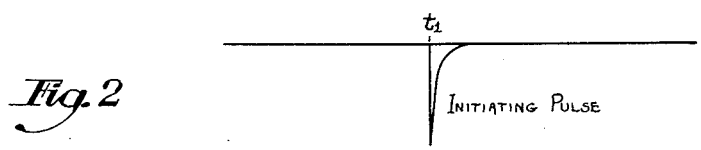
Fig. 2 — Initiating Pulse
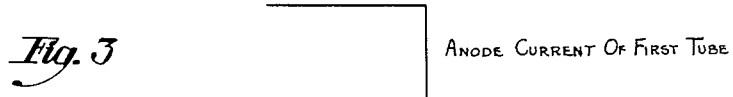
Fig. 3 — Anode Current Of First Tube
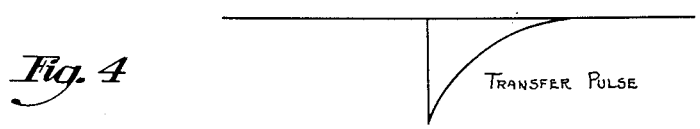
Fig. 4 — Transfer Pulse
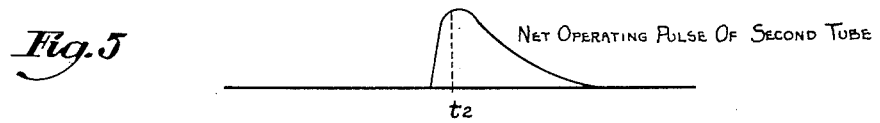
Fig. 5 — Net Operating Pulse Of Second Tube
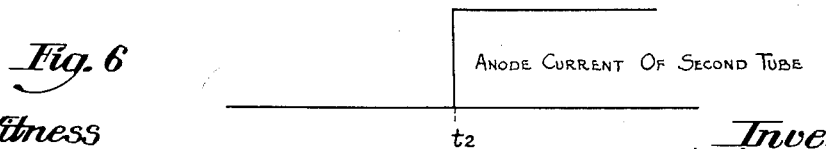
Fig. 6 — Anode Current Of Second Tube
Witness
H. E. Van Dine
Inventor
Wilcox P. Overbeck
by his attorneys
Fish Hildreth Cary Jenney Patented July 30, 1946

2,404,918

UNITED STATES PATENT OFFICE 2,404,918

COUNTING SYSTEM

Wilcox P. Overbeck, Waltham, Mass., assignor to Research Corporation, New York, N. Y., a corporation of New York Application May 1, 1940, Serial No. 332,853

13 Claims. (Cl. 250—27)

The present invention relates to electronic counting systems, and more particularly to systems which are used for counting electrical impulses at high speed.

In general, counting systems involve a series of electronic trigger circuits, in which the counting of the pulses is accomplished by progression of the triggering action from one circuit to the next. This progression has ordinarily been effected by a so-called priming action. An individual circuit which is in a conducting condition is arranged to produce a steady priming voltage which is applied to the input of the next circuit. The pulses to be counted are of an amplitude sufficient to trigger a primed circuit but insufficient to trigger an unprimed circuit. An incoming pulse to be counted is applied to all of the circuits but operates only on the primed circuit, that is, only on the circuit subsequent to the one which is already in conducting condition. The subsequent tube is in this way converted to the conducting condition of stability. In order to complete the progression, it is also necessary that the tube which has just been converted to the conducting condition should generate an extinguishing pulse which is fed back to the previous circuit to convert it to the non-conducting condition.

Such conventional counting circuits are of many types, but so far as I am aware, they all operate under the necessity for priming, as described above. These circuits are subject to a number of important disadvantages. First, the voltage of the incoming pulses must be closely held to a critical value, which is sufficient to trigger a primed tube, but still insufficient to trigger an unprimed tube. Second, the system requires exceptional consistency and uniformity of tube characteristics in order that the pulses may differentiate properly between the primed and unprimed condition. Third, the cost and complexity of counting circuits have been considerable, owing to the necessity of circuit elements to produce the priming action and to generate the extinguishing pulses. Furthermore, in counting circuits employing soft tubes such as thyratrons, the cost is further increased because the priming action makes it necessary to insulate all cathodes from one another.

The principal object of the present invention is to provide an electronic counting system which is not only simpler and less expensive than previous counting systems, but which is less critical to variations in the voltage of the impulses and, therefore, more reliable in operation.

With this object in view, the present invention contemplates the use of a series of trigger circuits in which the necessity of priming is avoided. As will hereinafter be described, the system of the present invention may be used with tubes of various types. In any type of system, according to the invention, each trigger circuit has two conditions of stability, namely, a first condition in which current flows to the anode, and a second condition in which no current flows to the anode, these two conditions being respectively designated as "on" and "off" conditions. In general, only one tube of the series is in the "on" condition. The impulses to be counted are applied to all of the circuits. The action of any impulse is to convert immediately any tube which is in the on condition to the off condition, that is, to destroy the first condition of stability under which the tube has been operating. This action of destroying the condition of stability generates a potential variation which is transferred to the next succeeding tube in a manner to turn it on. The impulse to be counted does not need to be of critical magnitude, it being only necessary that it should be sufficient to shift a conducting tube to the non-conducting condition, following which the transfer impulse is applied to shift the next succeeding tube from its non-conducting to its conducting condition.

In the preferred form, the system uses tubes of the type described in my co-pending application, Ser. No. 332,854 filed of even date herewith, although the principles of the invention are likewise applicable to other types of tubes which are also described herein.

Figure 8:
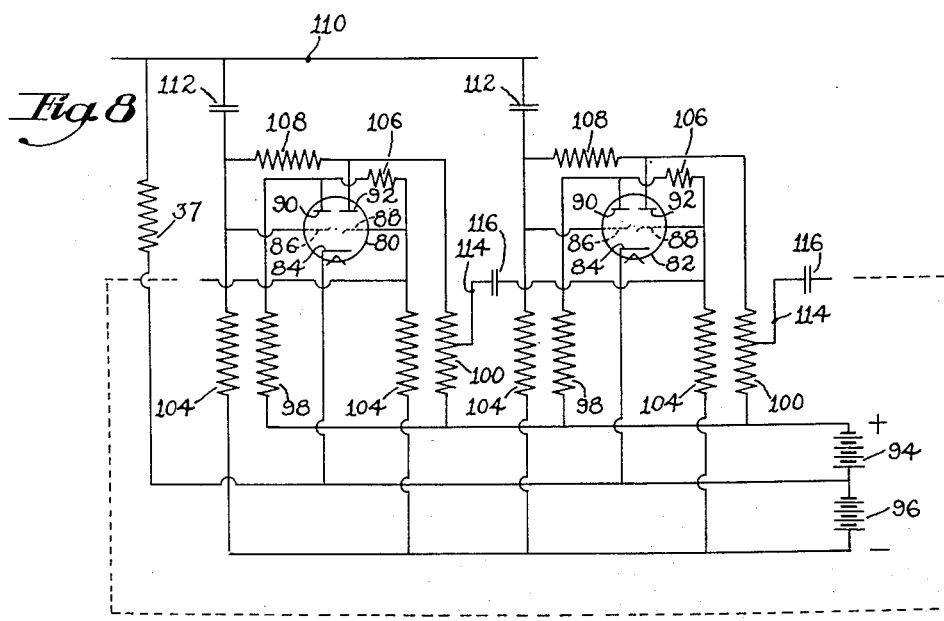

In the accompanying drawings Fig. 1 is a diagram of a circuit embodying the preferred form of the invention; Figs. 2 to 6 are graphical representations illustrating the variations in the various voltages in the circuit of Fig. 1; Fig. 7 is a diagram of a modified circuit; and Fig. 8 is a diagram of another modified form of circuit according to the present invention.

The counting system shown in Fig. 1 has three trigger circuits, each including a high vacuum space discharge tube, these tubes being designated 2, 4 and 6, respectively. For counting purposes a greater number of circuits will ordinarily be employed, but three circuits are sufficient for purposes of description. Each tube comprises an anode 8, a cathode 10 indirectly heated by a heater 12, a control grid 14, a screen grid 16, and a suppressor grid 18. The tubes may be of conventional pentode construction, but are preferably of the type described in my above mentioned co-pending application, according to which the several grids in each tube are disposed so that their wires are in alignment, whereby an electron beam is directed past the screen grid. If the suppressor grid is at cathode potential or slightly positive with respect to the cathode, most of the electrons pass through the screen grid to the anode and relatively few of the electrons impinge on the screen grid. The tube is then in one stable condition in which current flows in the anode circuit. If the suppressor is at a negative potential all of the electrons are repelled to the screen grid without passing to the anode, and the tube is in its other stable condition in which the anode circuit is non-conducting. These two stable conditions are designated as the "on" and "off" conditions, respectively.

Each trigger circuit, as shown in my co-pending application, utilizes connections whereby the circuit may be shifted from one stable condition to the other by a pulse of suitable magnitude and polarity, applied either to the suppressor grid or the control grid. The control grids 14 are connected through resistors 20 to the zero point of a potential source 22, to which point the cathodes 10 are also connected. The screen grids 16 are connected to a positive terminal of the source through resistors 24. The suppressor grids 18 are connected to a negative terminal of the source through resistors 26. The anodes are connected to the source at a point of positive potential through output devices illustrated as resistors 28. A coupling circuit comprising a parallel resistor 30 and condenser 32 is connected between the screen grid and suppressor grid of each trigger circuit. Each suppressor grid is connected through a condenser 34 to a common input lead 36, by which the pulses to be counted are applied to the trigger circuits.

As thus far described, each of the three trigger circuits shown in Fig. 1 is identical with the circuit described in my co-pending application.

A transfer circuit including a condenser 38 is connected from an intermediate point 40 of each screen grid resistor 24 to the control grid of the succeeding trigger circuit. From the resistor 24 of the last trigger circuit an input circuit is led to the control grid of the first tube, as indicated at 42, thus forming a closed chain. The connection 42 is shown partly in dotted lines to indicate that any number of trigger circuits may be utilized, and that the last tube of the chain is arranged to transfer into the first tube.

Assuming that one of the tubes in the ring is in the "on" condition, the application of a negative pulse to the input lead 36 will turn off that tube and turn on the next succeeding tube. This operation may be described by reference to the diagram of Figs. 2 to 6.

Let it be assumed initially that the first tube 2 is on; that is, current is flowing to its anode, its suppressor grid 18 is at approximately cathode potential or slightly positive with respect to the cathode, and its screen grid by intercepting relatively few electrons carries its minimum current. The screen grid potential is then at its maximum positive value. Tubes 4 and 6 are each in the other stable condition, namely, the condition in which the anode carries no current. The suppressor grid of each of these tubes is at a negative potential, while the screen grid carries substantially all of the electron current of the tube and is at its minimum positive potential.

The progression of the triggering action from tube 1 to tube 2 is effected by applying to the input lead 36 a pulse which is negative with respect to the cathode. Fig. 2 is a graph in which the pulse voltage applied to the suppressor grids is plotted against time. The pulse starts at time $t_1$ and decays rapidly toward zero. The application of this pulse to the suppressor grid of the first tube immediately cuts off the anode current of that tube. The anode current as plotted in Fig. 3 has a positive value up to time $t_1$ and then immediately drops to zero. The negative pulse has no direct effect on tubes 4 and 6 which are already off.

The cutoff of the anode current of tube 2 is accompanied by an increase in current to its screen grid 16, and a consequent decrease in the positive potential of the screen grid. This decrease of screen grid potential is fed through the coupling circuit 30, 32 to the suppressor to sustain the non-conducting stable condition of tube 2 which was initiated by the negative pulse. The increase of screen grid current also drops the potential of the intermediate point 40 of the resistor 24, which is included in the control grid circuit of the second tube 4. Since the control grid of tube 4 is initially at cathode potential, it must become negative momentarily until sufficient current has flowed through condenser 38 and resistor 20 to restore the control grid to cathode potential. Stated in another way, the change of screen grid current of tube 2 applies a negative transfer pulse to the control grid of tube 4. This negative pulse is plotted against time in Fig. 4. It will be noted that the duration of this pulse is longer than that of the pulse applied to the input circuit. This is accomplished by making the time constant of the circuit 38, 20 longer than the duration of the initiating impulse of Fig. 2, so that the negative pulse at the control grid of the second tube is still effective after the incoming pulse has substantially subsided.

The negative pulse applied to the control grid of tube 4 has an effect similar to the application of a positive pulse to the suppressor grid, all as described in my co-pending application. This may be briefly explained by noting that the negative pulse at the control grid diminishes the total number of electrons flowing through the tube, thereby reducing the screen grid current; the consequent increase of screen grid potential is then fed through the coupling circuit 30, 32 to the suppressor grid. The instantaneous potential at the suppressor grid is therefore due to the combined effect of the initiating negative impulse applied through 34 and the positive impulse fed through the coupling circuit from the screen grid. Owing to the longer duration of the latter impulse, the effect is to apply a net positive impulse to the suppressor grid. This net impulse is plotted in Fig. 5. When the voltage of the impulse reaches a sufficient value (at time $t_2$) the tube is turned on. The anode current of the second tube is plotted in Fig. 6, rising immediately from zero to a positive value at $t_2$. The "on" condition is thereafter maintained until its stability is upset by a subsequent impulse.

Connected between the input lead 36 and the cathodes is a resistor 37 which is of low enough resistance to prevent the net positive impulse described above from affecting the other tubes in the chain.

The turning on of tube 4 diminishes the screen grid current and thus applies a positive impulse to the control grid of tube 6, but since this tube is already in the "off" condition, no change results. The whole effect, therefore, of the application of the initiating pulse to lead 36 is to turn off tube 2 and to turn on tube 4. Succeeding negative pulses applied at 36 cause the triggering action to progress from tube to tube around the chain.

To count at any time the number of pulses which have been applied, it is only necessary to note which tube is on. If pulses in large number are to be counted, a carry-over device may be used to transmit impulses to a second chain each time the first chain repeats. Such carry-over devices are well-known and form no part of the present invention.

When the invention is used with tubes of the type described in my co-pending application, it offers the advantages of simplicity and reliability as well as extremely high speed of operation. From the foregoing description, it will be observed that the disadvantages which arise from the necessity of priming in the ordinary circuit have been here completely avoided.

In Fig. 7 is shown an embodiment of my invention to a counting chain employing thyratron tubes 50 and 52. In this embodiment the invention also has the advantage of operation without priming, although the system does not have the high-speed characteristics of the circuit of Fig. 1, which employs hard tubes. In Fig. 7 each tube has an anode 54, a directly heated cathode 56, and a control grid 58. Each tube is filled with an ionizable inert gas or vapor. The tubes are energized from a source 60, the negative terminal of which is connected to the cathodes, and the other terminal through resistors 62 to the anodes. A source of negative bias voltage 64 is connected through resistors 66 to the grids and is of sufficient magnitude to prevent the start of current flow through the tubes. A positive voltage impulse applied at the control grid of either tube will initiate current flow, which the bias voltage will not be able to stop until a negative impulse of sufficient duration to allow de-ionization is applied at the anode. An input lead 68 is connected with the anodes through condensers 70. To cause progression of the triggering action, a transfer lead 72 connects from an intermediate point of each resistor 62 through a condenser 74 to the grid of the next succeeding tube. In Fig. 7 only two tubes are shown, but the system may comprise any number, as indicated by the dotted transfer connection 76 leading from the anode circuit of the last tube to the grid of the first tube.

Assuming initially that the first tube 50 is conducting current and that all other tubes in the chain are in the non-conducting condition, an impulse negative with respect to the cathode applied to the input lead 68 and fed through condensers 70 to the anodes, will stop the flow of current in the first tube 50 without affecting other tubes. The negative bias voltage 64 will prevent the first tube from re-igniting even after the termination of the impulse and therefore its anode potential will rise to that of the source 60. This change of potential in the positive direction applies a positive transfer impulse through the condenser 74 to the control grid of the second tube. This positive transfer pulse is of longer duration than the negative pulse applied at 68 so that the second tube then ignites. The ultimate effect of the pulse applied at 68 is thus to turn off tube 50 and to ignite tube 52. As in the circuit of Fig. 1, successive impulses applied to the input lead 68 will cause the "on" condition to transfer along the chain from one tube to the next. Also, as in the case of Fig. 1, this result is accomplished without any reliance on priming.

The circuit of Fig. 8 is another embodiment of my invention utilizing triode tubes of the extremely high vacuum type. Two triodes are necessary for each trigger circuit. As illustrated in the drawings, the two triodes of each circuit are included in a single envelope (designated at 80 and 82 for the tubes of the two circuits). Each double triode comprises an indirectly heated common cathode 84, grids 86, 88, and anodes 90, 92. The cathodes are all connected to the junction of two voltage sources 94 and 96 in series. The positive terminal of source 94 is connected through resistors 98 to the anodes 90, and through resistors 100 to the anodes 92 of the several tubes. The negative terminal of source 96 is connected through resistors 104 with the grids 86, 88 of the several tubes. Each anode 90 is coupled with the opposite grid 88 through a resistor 106 and each anode 92 is coupled with the opposite grid 86 through a resistor 108. An input lead 110 to which the initiating pulses are applied is connected with the grids 86 of the several tubes through condensers 112. From an intermediate point of each resistor 100 a transfer lead 114 including a condenser 116 leads to the grid 88 of the next succeeding tube in the chain. As in the preceding diagrams the transfer connection from the final tube to the first tube is shown in dotted lines.

Each tube has two conditions of stability. In one stable condition current flows to anode 90 but not to anode 92, while in the other stable condition current flows to anode 92 but not to anode 90. The operation of the system of Fig. 8 will be described by assuming that the first tube 80 is in one stable condition wherein current flows to the anode 90 while all other tubes of the chain are in the other stable condition wherein current flows to anode 92. An impulse negative with respect to the cathode applied to the input lead 110 and through condensers 112 will shift the current in the first tube to anode 92 for the following reasons: The first effect of the pulse is to cut off the flow of current to anode 90; the positive potential at 90 will therefore increase, and this change of potential is fed through the coupling resistor 106 to grid 88, thereby causing current to flow to the anode 92. The flow of current to anode 92 diminishes the potential at 92 and this decrease of potential is fed through the coupling resistor 108 to maintain the grid 86 negative.

The negative initiating pulse has no immediate effect on the second and subsequent tubes in the chain, but the flow of current to anode 92 of the first tube and the consequent reduction of potential across resistor 100 transfers a negative pulse through condenser 116 to the grid 88 of the second tube, thereby cutting off the current to anode 92 of the second tube and transferring a positive pulse through coupling resistor 108 to grid 86 of this tube. The positive pulse transmitted through resistor 108 is of longer duration than the negative initiating pulse applied through condenser 112 so that the net effect is a positive pulse applied to grid 86 of the second tube, thereby causing the anode 90 to become conducting and sustain the stable conducting condition until a subsequent pulse comes in over the input lead. Thus successive impulses applied to the input lead 110 cause the triggering action to progress by shifting the condition from one anode to the other in each of the successive tubes of the chain.

The three forms of the invention herein described are similar in that no priming action is required and the disadvantages of priming heretofore noted are avoided. In each case a trigger circuit in the first condition of stability is converted to the second condition of stability by the application of an initiating impulse to the several circuits. As a consequence of this conversion, a transfer impulse is generated which is applied to the next succeeding trigger circuit of the chain to convert said circuit from the second to the first condition of stability. These principles are equally applicable to the several embodiments of the invention herein described. It is, however, preferred to use so-called hard tubes, as illustrated in Figs. 1 and 8, since such tubes may be operated by impulses which succeed one another with extreme rapidity. The system of Fig. 7 is necessarily somewhat slower acting because of the time required for de-ionization in the conversion of any tube from the conducting to the non-conducting condition. As between the systems of Figs. 1 and 8, that of Fig. 1 is ordinarily to be preferred when utilizing tubes of the type described in my co-pending application because of its simplicity.

Having thus described the invention, I claim:

1. A counting system for counting electrical impulses comprising a series of electronic circuits, each of said circuits having independently two conditions of stability, means in each circuit responsive to an electrical impulse to destroy one of said conditions of stability, common input means for applying a succession of electrical initiating impulses to all of said circuits, each impulse acting to destroy said first condition of stability in any of said circuits in which said first condition of stability exists without affecting the second condition of stability in the other circuits, and connections for applying a potential variation produced by destruction of the first condition of stability in any such circuit to the next succeeding circuit to establish the first condition of stability in said succeeding circuit.

2. A counting system for counting electrical impulses comprising a series of electronic circuits, each of said circuits having independently two conditions of stability, means in each circuit responsive to an electrical impulse to destroy one of said conditions of stability, common input means for applying a succession of electrical initiating impulses to all of said circuits, each impulse acting to destroy said first condition of stability in any of said circuits in which said first condition of stability exists without affecting the second condition of stability in the other circuits, means for generating a transfer impulse by destruction of said first condition of stability in any such circuit, said transfer impulse being of longer duration than the initiating impulse, and connections to apply the transfer impulse to the next succeeding circuit to convert said circuit from the second to the first condition of stability.

3. A counting system for counting electrical impulses comprising a series of electronic circuits, each of said circuits including an electronic device having a conducting and a non-conducting condition of stability, means in each circuit responsive to an electrical initiating impulse to convert the electronic device from the conducting to the non-conducting condition, a common input circuit for applying a succession of initiating pulses to all of the circuits, each pulse acting to convert any circuit in which the conducting condition exists to the non-conducting condition, means operating on such conversion to generate a transfer impulse of substantially longer duration than the initiating impulse, and connections to apply the transfer impulse to the next succeeding circuit to convert said circuit to the conducting condition.

4. A counting system for counting electrical impulses comprising a series of electronic circuits, each of said circuits including an electronic device having a conducting and a non-conducting condition of stability, means in each circuit responsive to an electrical initiating impulse to convert the electronic device from the conducting to the non-conducting condition, a common input circuit for applying a succession of initiating pulses to all of the circuits, each pulse acting to convert any circuit in which the conducting condition exists to the non-conducting condition, means operating on such conversion to generate a transfer impulse of longer duration than the initiating impulse, and connections to apply the transfer impulse to the next succeeding circuit to convert said circuit to the conducting condition.

5. A counting system for counting electrical impulses comprising a chain of trigger circuits each including a tube having a cathode, a control grid, a screen grid, a suppressor grid and an anode, coupling means between the screen grid and suppressor grid of each trigger circuit, the several circuits each having a conducting and a non-conducting condition of stability, an input circuit connected with the suppressor grids to impress thereon electrical impulses to convert any tube in the conducting condition to the non-conducting condition, and transfer means between each circuit and the control grid of the next succeeding circuit and operated by said conversion of any circuit to convert the succeeding circuit to the conducting condition.

6. A counting system for counting electrical impulses comprising a chain of trigger circuits each including a tube having a cathode, a control grid, a screen grid, a suppressor grid and an anode, coupling means between the screen grid and suppressor grid of each trigger circuit, the several circuits each having a conducting and a non-conducting condition of stability, an input circuit connected with the suppressor grids to impress thereon electrical impulses to convert any tube in the conducting condition to the non-conducting condition, a circuit element in each trigger circuit to generate a transfer impulse upon such conversion, and means for applying such transfer impulse to the control grid of the succeeding trigger circuit to convert the latter to the conducting condition.

7. A counting system for counting electrical impulses comprising a chain of trigger circuits each including a tube having a cathode, a control grid, a screen grid, a suppressor grid and an anode, coupling means between the screen grid and suppressor grid of each trigger circuit, the several circuits each having a conducting and a non-conducting condition of stability, an input circuit connected with the suppressor grids to impress thereon electrical impulses to convert any tube in the conducting condition to the non-conducting condition, a circuit element in each trigger circuit to generate a transfer impulse upon such conversion, and a transfer circuit to apply said impulse to the control grid of the succeeding tube, the transfer circuit having a time constant such that the transfer impulse is of greater duration than the initiating impulse.

8. A counting system for counting electrical impulses comprising a chain of trigger circuits each including a tube having an ionizable substance, a cathode, a grid and an anode, the anodes being normally maintained at positive potential and the grids at negative potential with respect to the cathodes, the several tubes having a conducting and a non-conducting condition of stability, an input circuit connected with the several anodes to apply a negative initiating impulse thereto and thereby to convert any tube which is in the conducting condition to the non-conducting condition, and a transfer circuit to apply to the grid of the next succeeding tube a positive transfer impulse to convert said tube to the conducting condition.

9. A counting system for counting electrical impulses comprising a chain of trigger circuits each including a tube having an ionizable substance, a cathode, a grid and an anode, the anodes being normally maintained at positive potential and the grids at negative potential with respect to the cathodes, the several tubes having a conducting and a non-conducting condition of stability, an input circuit connected with the several anodes to apply a negative initiating impulse thereto and thereby to convert any tube which is in the conducting condition to the non-conducting condition, and a transfer circuit to apply to the grid of the next succeeding tube a positive transfer impulse to convert said tube to the conducting condition, the transfer circuit having a time constant such that the duration of the transfer impulse is greater than that of the initiating impulse.

10. A counting system for counting electrical impulses comprising a chain of trigger circuits each including two triodes, each circuit having a first condition of stability in which one of the triodes is conducting and a second condition of stability in which the other triode is conducting, an input circuit to apply an electrical initiating impulse to the several trigger circuits and to convert any trigger circuits which are in the first condition of stability to the second condition of stability, means operated by such conversion to generate a transfer impulse, and a transfer circuit between each trigger circuit and the next succeeding trigger circuit to apply the transfer pulse to said succeeding circuit and thereby to cause conversion thereof to the first condition of stability.

11. A counting system for counting electrical impulses comprising a chain of trigger circuits, each including two triodes, each circuit having a first condition of stability in which one of the triodes is conducting and a second condition of stability in which the other triode is conducting, an input circuit to apply an electrical initiating impulse to the several trigger circuits and to convert any trigger circuits which are in the first condition of stability to the second condition of stability, means operated by such conversion to generate a transfer impulse, and a transfer circuit between each trigger circuit and the next succeeding trigger circuit to apply the transfer pulse to said succeeding circuit and thereby to cause conversion thereof to the first condition of stability, the transfer circuit having a time constant such that the transfer impulse has a greater duration than the initiating impulse.

12. A counting system for counting electrical impulses comprising a series of electrical circuits, each of said circuits having independently a first condition and a second condition of stability, means in each circuit responsive to an electrical impulse to destroy the first condition of stability, additional means in each circuit responsive to an electrical impulse to convert the circuit from the second to the first condition of stability, inter-circuit transfer connections including said additional means, a common input circuit for applying a succession of electrical initiating impulses to all of said circuits, each impulse acting to destroy the first condition of stability in any of said circuits in which said condition exists, means produced by destruction of said first condition of stability in any such circuit to generate a transfer impulse of substantially longer duration than the initiating impulse, and means for applying the transfer impulse through the inter-circuit connections to the next succeeding circuit to convert said circuit from the second to the first condition of stability.

13. A counting system for counting electrical impulses comprising a series of electronic circuits, each of said circuits including an electronic path having a conducting and a non-conducting condition of stability, means in each circuit responsive to an electrical impulse to destroy the conducting condition, additional means in each circuit responsive to an electric impulse to effect conversion from the non-conducting to the conducting condition, inter-circuit transfer connections including said additional means, a common input circuit for applying a succession of electrical initiating impulses to all of said circuits, each impulse acting to destroy the conducting condition in any of said circuits in which it exists, means produced by destruction of the conducting condition in any such circuit to generate a transfer impulse of substantially longer duration than the initiating impulse, and means for applying said transfer impulse through the inter-circuit connections to the next succeeding circuit to convert said circuit to the conducting condition.

WILCOX P. OVERBECK.